(12) United States Patent
Astrakhantsev et al.

(10) Patent No.: US 11,860,930 B2
(45) Date of Patent: *Jan. 2, 2024

(54) AUTOMATIC IMAGE SELECTION FOR VISUAL CONSISTENCY

(71) Applicant: Microsoft Technology Licensing, LLC, Redmond, WA (US)

(72) Inventors: Nikita Astrakhantsev, Bellevue, WA (US); Parthasarathy Govindarajen, Sammamish, WA (US); Arun Sacheti, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

This patent is subject to a terminal disclaimer.

(21) Appl. No.: 17/699,997

(22) Filed: Mar. 21, 2022

(65) Prior Publication Data

US 2022/0207078 A1 Jun. 30, 2022

Related U.S. Application Data

(63) Continuation of application No. 16/672,310, filed on Nov. 1, 2019, now Pat. No. 11,314,802.

(51) Int. Cl.

| G06F 16/538 | (2019.01) |
| G06F 16/55 | (2019.01) |
| G06F 16/535 | (2019.01) |
| G06F 18/22 | (2023.01) |
| G06F 18/23 | (2023.01) |
| G06V 10/778 | (2022.01) |
| G06V 20/00 | (2022.01) |

(52) U.S. Cl.
CPC ......... *G06F 16/538* (2019.01); *G06F 16/535* (2019.01); *G06F 16/55* (2019.01); *G06F 18/22* (2023.01); *G06F 18/23* (2023.01); *G06V 10/7788* (2022.01); *G06V 20/00* (2022.01)

(58) Field of Classification Search
None
See application file for complete search history.

(56) References Cited

U.S. PATENT DOCUMENTS

| 8,909,625 | B1 | 12/2014 | Stewenius |
| 11,314,802 | B2 * | 4/2022 | Astrakhantsev ...... G06F 16/535 |
| 2010/0067809 | A1 | 3/2010 | Kawata et al. |

(Continued)

OTHER PUBLICATIONS

"Notice of Allowance and Fees Due for U.S. Appl. No. 16/672,310", dated Dec. 21, 2021, 19 pages.

*Primary Examiner* — Bernard Krasnic
(74) *Attorney, Agent, or Firm* — Calfee, Halter & Griswold LLP

(57) ABSTRACT

An image selector selects images for visual similarity in some aspects and visual distinction in other aspects. A user submits a query to a search engine. Images identified by the search engine as relevant to the query are clustered into clusters having at least one similar attribute. Selection mechanisms organize images selected from each cluster based on a similarity metric into image rows. A selection metric is calculated for each image row and a row to be displayed is selected based on the selection metric. In some embodiments, images representative of a subset of image rows are displayed to a user and responsive to selection of a representative image, the corresponding image row is displayed.

20 Claims, 13 Drawing Sheets

(56) References Cited

U.S. PATENT DOCUMENTS

| | | | |
|---|---|---|---|
| 2010/0303342 A1* | 12/2010 | Berg | G06F 16/583 |
| | | | 382/218 |
| 2011/0129159 A1* | 6/2011 | Cifarelli | G06F 16/51 |
| | | | 382/284 |
| 2013/0054620 A1 | 2/2013 | Stokes | |
| 2015/0169645 A1* | 6/2015 | Li | G06F 16/532 |
| | | | 707/722 |
| 2015/0199386 A1 | 7/2015 | Stokes | |
| 2019/0087684 A1* | 3/2019 | Gao | G06V 10/763 |
| 2019/0379795 A1* | 12/2019 | Yamaji | H04N 1/00143 |
| 2021/0133229 A1 | 5/2021 | Astrakhantsev et al. | |
| 2022/0189199 A1* | 6/2022 | Liu | G06V 40/172 |

\* cited by examiner

AUTOMATIC IMAGE SELECTION FOR VISUAL CONSISTENCY

RELATED APPLICATION

This application is a continuation of U.S. patent application Ser. No. 16/672,310, filed on Nov. 1, 2019, and entitled "AUTOMATIC IMAGE SELECTION FOR VISUAL CONSISTENCY", the entirety of which is incorporated herein by reference.

FIELD

This application relates generally to image search techniques. More specifically, this application relates to automatic selection of which images to display in response to a search query.

BACKGROUND

One popular use case for a search engine is to visually compare images returned as a result of submitting a query to the search engine. However, current search engines return sets of images that make it difficult for users to visually compare the results.

It is within this context that the present embodiments arise.

DETAILED DESCRIPTION

Figure 1:
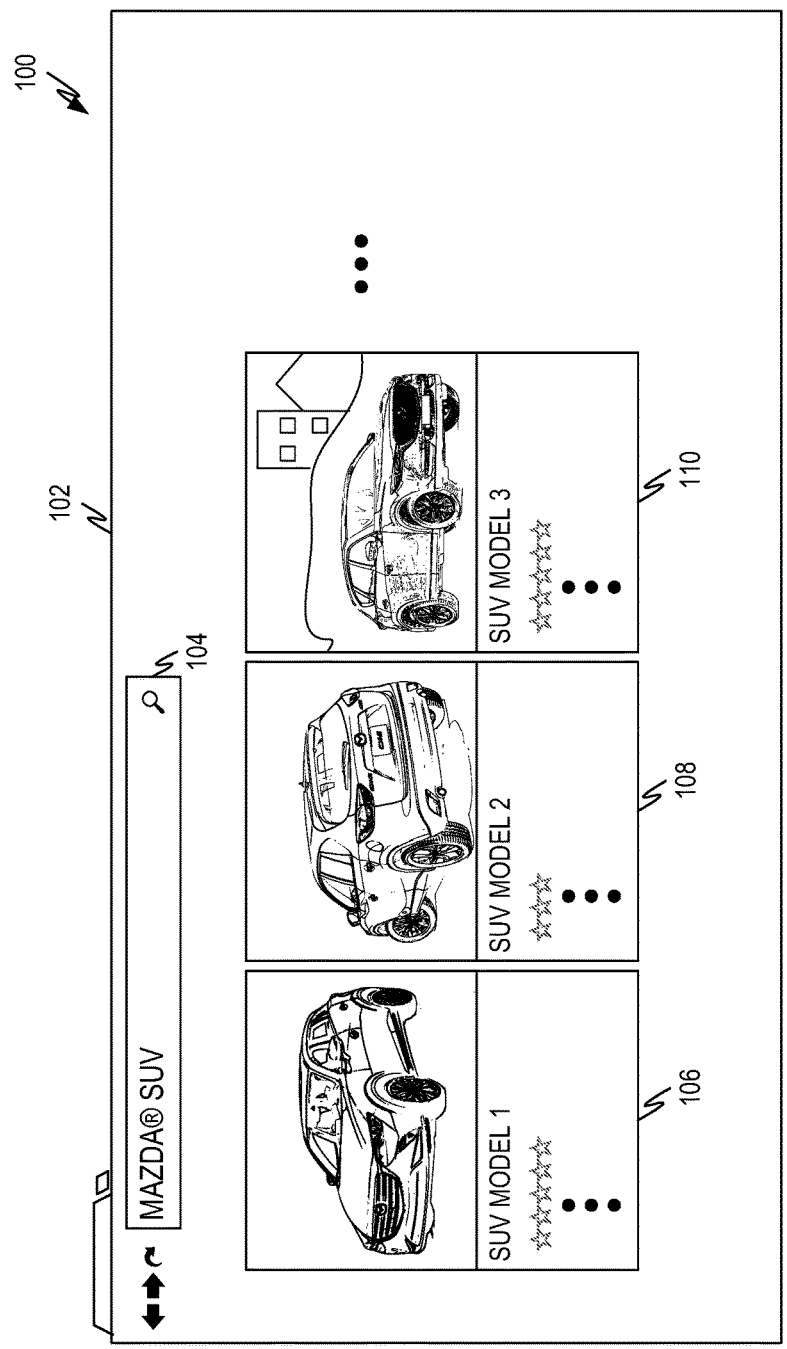
FIG. 1 illustrates an example of a set of results images returned in response to a query using prior art techniques.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

In the prior art, search systems little attention to the visual similarity or dissimilarity between images. The images presented to the user are simply deemed relevant to the query. Thus, it can be difficult for a user to visually compare items in the images. For example, if the user submits a query, the search system will identify relevant images and present them to the user based on relevance to the query. There is no consideration of the visual similarity or dissimilarity in the images. Thus, from a visual appearance, the images can be very different. For example, if the user searches for Sport Utility Vehicles (SUVs) from a manufacturer, the images can be of SUVs that have different colors, view aspects, backgrounds, and so forth. In many instances, there is no consideration to even present images of a spectrum of items. In the SUV example, there can be multiple images of one model of SUV and no images of another model of SUV.

Presenting such visually random images can make it difficult for a user to compare items in the images. For example, depending on the use case, it may be beneficial to present images that are visually similar, or present images that cover a range of attribute values. For example, if the user's purpose is to compare one model of SUV to another to identify differences in the model year, the user's task would be made easier by presenting images of different SUVs while making sure the vehicles are the same or similar color, have the same or similar backgrounds, have the same view aspect, and so forth. Thus, in one use case, images that are visually similar would be useful.

In other use cases the goal is to present a different combination of similarities and/or differences. For example, in a second use case the images can be of the same item with different attributes. For example, the same model SUV with similar view aspects, but with different colors so the user can compare color and decide which they like best. Thus, in general, embodiments of the present disclosure select images with a first set of constant attributes and a second set of varying aspects. In this disclosure, a set is one or more items and a subset is all or less than all items in a set.

Thus, embodiments of the present disclosure improve the functioning of the machine by adding the ability to categorize images into image sets (called rows in this disclosure) that are visually similar in some ways and are dissimilar in other ways. This improves the utility of the machine and allows the machine to be used in use cases where the prior art has little utility.

Embodiments of the present disclosure can be integrated into a search system or search engine or can be implemented as "post processing" on the images that the search system has identified as relevant to a user query.

A user inputs a query and the search engine identifies a plurality of images that are relevant to the input query. Each image has associated attributes that can include, but are not limited to, any combination of: item color (color of the item in the image); image background type and/or color; item view angle, item description/item descriptor (e.g., manufacturer, item model identifier, model year, etc.); and/or other attributes. In some instances, the attribute values can be based on majority or predominant aspect of the image. For example, the image may have different colors in the background and so the background color attribute can be the predominant color in the background or based on the color of a feature in the background.

A set of constant attributes and a set of varying attributes are identified, based on the use case. The images are then clustered by one or more of the varying attributes so that each image in a cluster has one or more varying attributes in common. For example, one of the varying attributes may be model number. The images can be clustered so that each cluster has a common model number. In another example, one of the varying attributes can be item color so that the images are clustered so that each cluster has a common item color. Images can be clustered by more than one varying attributes. In this case, the clusters will have more than one varying attribute in common (e.g., model number and item color).

After the images are clustered, a reference image is selected from a reference cluster. A similarity score is calculated in pairwise fashion for images in one or more other clusters. The similarity score is calculated based on one or more of the common attributes. For example, the similarity score may be calculated based on item view angle and predominant background color. Thus, images that have view angles and predominant background color that match the reference image will have higher similarity scores while images that diverge from the reference image in these attributes will have lower similarity scores.

The most similar and/or least similar image from each cluster as determined by the similarity scores can be selected and combined with the reference image into an image row. The process can be repeated until all images in the reference cluster have been combined with images from other clusters into image rows.

A selection metric can be calculated for each of the image rows based on the similarity scores for the pictures in that row. The image row with the highest selection score can be selected for display to the user.

In some embodiments, the user search history can be used to select images and/or image rows as explained herein.

In some embodiments, a representative image for a plurality of image rows can be selected based on the images in the image row. The representative images can be presented to the user. By selecting one of the representative images, the user can select which image row is displayed.

These and other aspects are explained more fully below.

DESCRIPTION

As a general matter, the methods and systems described herein may include, or otherwise make use of, a machine-trained model to identify similarity between images, identify attributes associated with an image, and other aspects as described herein. Machine learning (ML) generally involves various algorithms that can automatically learn over time. The foundation of these algorithms is generally built on mathematics and statistics that can be employed to predict events, classify entities, diagnose problems, and model function approximations. As an example, a system use data to train a ML model in order to identify attributes in an image, such as a predominant item color, a predominant background color, a "view" orientation of an object, and/or other attributes as described herein. In another example, a system can use data to train a ML model that identifies how similar two input images are and that produces a similarity score. Such determination may be made following the accumulation, review, and/or analysis of data from images over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a machine learning method may be used for initial training and/or subsequent training of a machine learning model using training data obtained from a training data repository, from device-generated data, from direct and/or indirect feedback from users, and so forth as described herein. The training may include and/or have access to substantial computation resources for training, such as a cloud, including many computer server systems adapted for machine learning training. In some implementations, the ML model training automatically generates multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example 100 of a set of results images 106, 108, 110, returned in response to a query 104 using prior art techniques. In the prior art, users can enter a query 104 to be submitted to a search engine and the search engine can return a set of images 106, 108, 110, that are determined to be relevant to the query 104 and display the results in a user interface 102 so the user can view the images.

In the prior art, the search system does not pay any attention to the visual similarity or dissimilarity between images. The images presented to the user are simply deemed relevant to the query. Thus, it can be difficult for a user to visually compare items in the images. For example, if the user submits a query, such as "Mazda® SUVs" the search system will identify relevant images 106, 108, 110, and present them to the user. There is no consideration of the visual similarity or dissimilarity in the images. Thus, from a visual appearance, the images can be very different. For example, the images can be of items that have different colors, view aspects, backgrounds, and so forth. In many instances, there is no consideration to even present images of a spectrum of items. In the "Mazda® SUVs" example, there can be multiple images of one model of SUV and no images of another model of SUV.

Presenting such visually random images can make it difficult for a user to compare items in the images. For example, depending on the use case, it may be beneficial to present images that are visually similar, or present images that cover a range of attribute values. For example, if the user's purpose is to compare one model of Mazda® SUV to another to identify differences in the model year, the user's task would be made easier by presenting images of different Mazda® SUVs while making sure the vehicles are the same or similar color, have the same or similar backgrounds, have the same view aspect, and so forth. Thus, in one use case, images that are visually similar would be useful. Other use cases will be made easier with a different combination of similarities and/or differences as explained herein.

Figure 2:
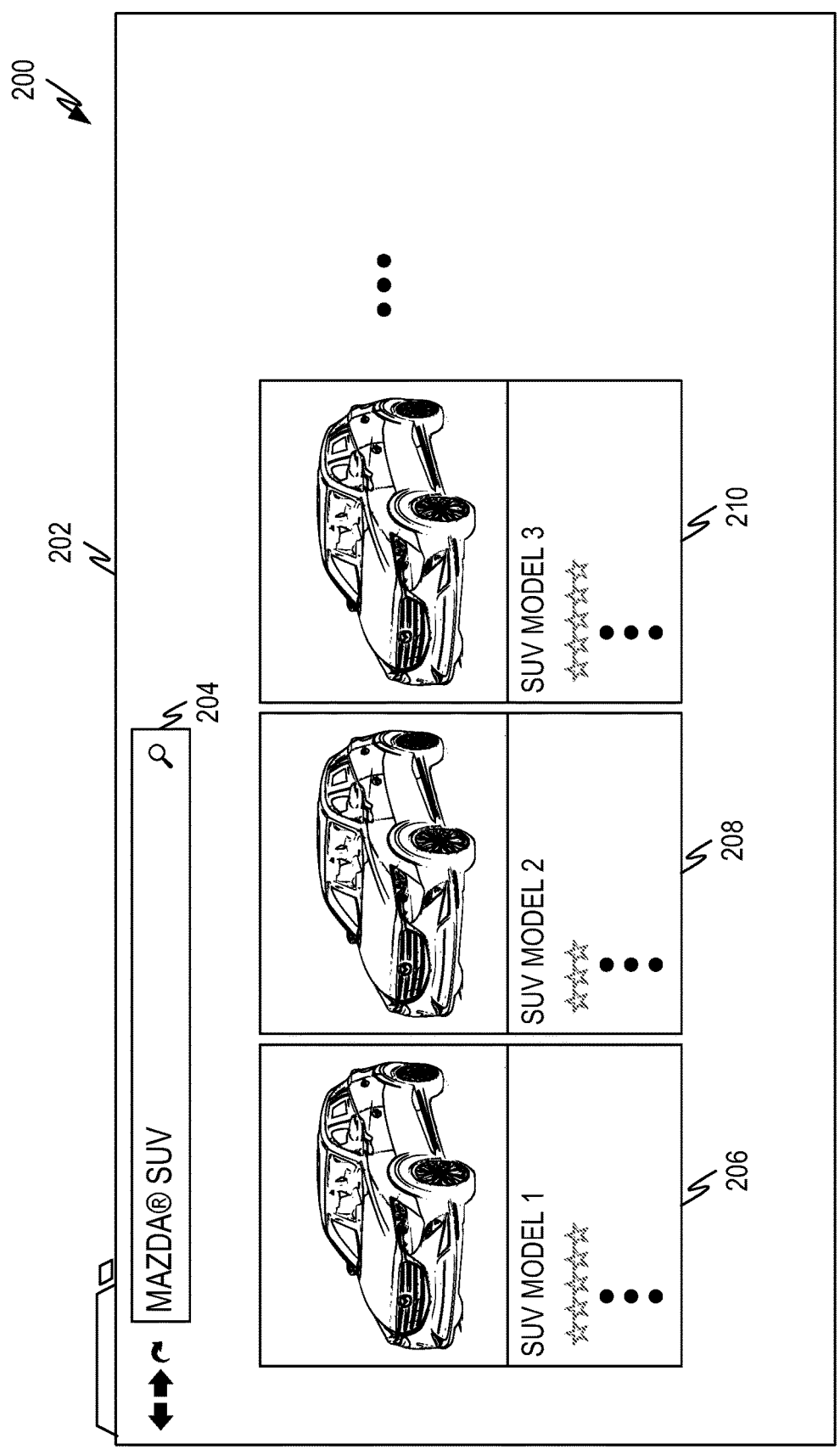
FIG. 2 illustrates an example of a set of results images returned in response to a query according to some aspects of the present disclosure.

FIG. 2 illustrates an example 200 of a set of results images 206, 208, 210 returned in response to a query 204 according to some aspects of the present disclosure. This example shows a first use case where visually similar images of different items are presented. Using the same submitted query ("Mazda® SUVs") 204, the images presented to a user in the user interface 202 comprise images of different models of SUV, where the images are chosen to be visually similar. Thus, image 206, 208, and 210 show different models of SUV, with similar backgrounds and similar SUV color. The results images 206, 208, 210 are part of an image row as explained in greater detail herein.

In a second use case (not shown) the images can be of the same item with different attributes. For example, the same model SUV with similar view aspects, but with different colors so the user can compare color. Thus, in general, the images are selected with a first set of constant attributes and a second set of varying aspects. In this disclosure, a set is one or more items and a subset is all or less than all items in a set.

Figure 3:
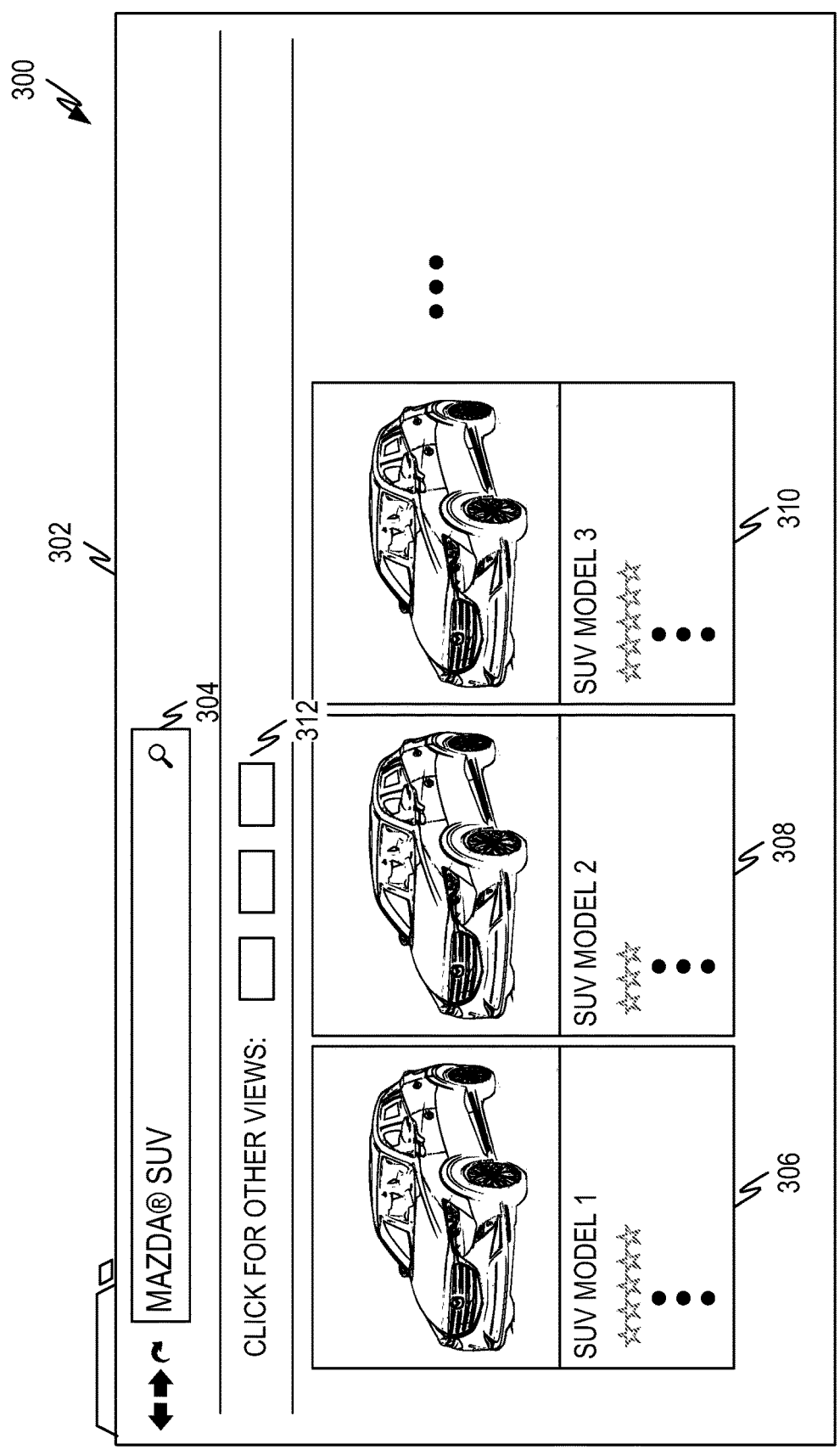
FIG. 3 illustrates an example user interface and a set of results images returned in response to a query according to some aspects of the present disclosure.

FIG. 3 illustrates an example 300 user interface 302 and a set of results images 306, 308, 310, returned in response to a query 304 according to some aspects of the present disclosure. In this embodiment, a set of results images 306, 308, 310 are displayed in response to a user query 304 in a user interface 302. The results images 306, 308, 310 are part of an image row as explained in greater detail herein. The results images in an image row (e.g., 306, 308, 310) are visually similar in constant attributes such as item view angle, item color, and image background, and are different in selected varying attributes, such as SUV model.

The system can select representative images for a plurality of the image rows and present the representative images 312 to the user. Any representative image for the currently displayed image row can be highlighted or otherwise distinguished from the remaining representative images so that the user can tell which representative image is illustrative of the currently displayed image row. If a user selects a different representative image, the system can display the image row associated with the selected representative image. In this way, the user can bring up different sets of images.

The representative images can be created and/or selected based on the common attributes of the image row. For example, if the images are similar in color, view angle, and background color, but the color, view angle, and/or background color change from image row to image row, the representative images can illustrate color, view angle, and/or background color so that the user can identify what attributes will be associated with the displayed images.

Figure 4:
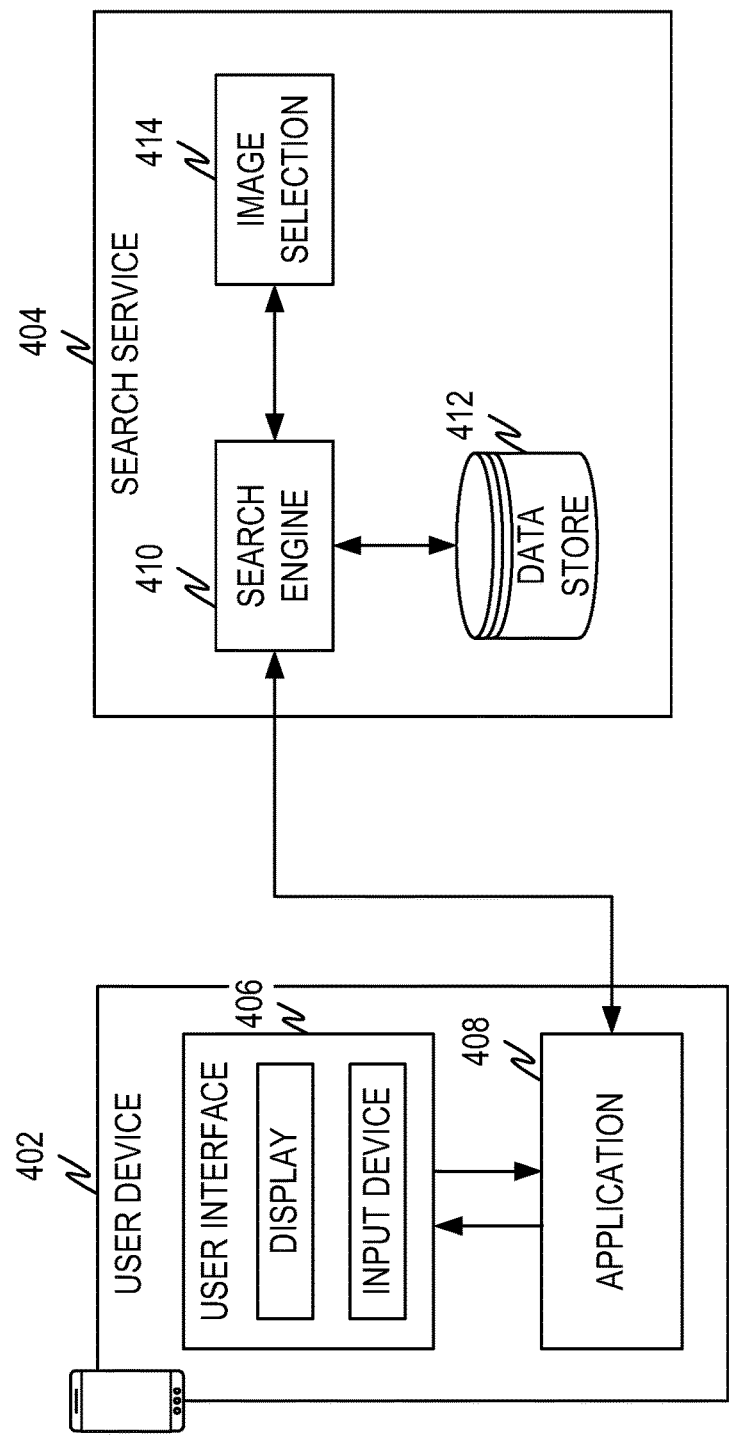
FIG. 4 illustrates an example architecture according to some aspects of the present disclosure.

FIG. 4 illustrates an example architecture 400 according to some aspects of the present disclosure. A search service 404 (also referred to as a search system) comprises a search engine 410, one or more data stores 412, and image selection process 414. The image selection process 414 can be part of the search service 404 or can be separate from the search service and operate on the output of the search engine.

A user interacts with the search service 404 via a user device 402. The user device 402 includes a user interface (UI) 406 which can include UI controls, and so forth displayed on a display device. Furthermore, the user interacts with the UI and/or display via one or more input devices, such as a touch screen, mouse, pen, keyboard, and so forth.

The user typically uses an application 408 such as a web browser or other application to interact with the search service 404. For example, the application 408 can present UI on the display through which a user can enter a search query, receive, view, and interact with search results, and so forth as is typically known.

The search engine 410 and one or more data stores 412 operate in the manner usually associated with search engines/data stores. The search engine 410 receives a query from a user, such as via the user interacting with a web browser or other application. The search engine 410 retrieves search results that are relevant to the query. Included in these search results can be one or more images that are determined to be relevant to the search query. In the context of this disclosure, relevant means results that the search engine determines can be presented to the user as being responsive to the entered query.

A subset of images determined to be relevant by the search engine are processed by the image selection process 414 in order to select images that are visually similar and/or different as described herein, depending on the use case. The resultant images are presented as described herein in order to facilitate visual comparison and other goals of the use cases described herein.

Figure 5:
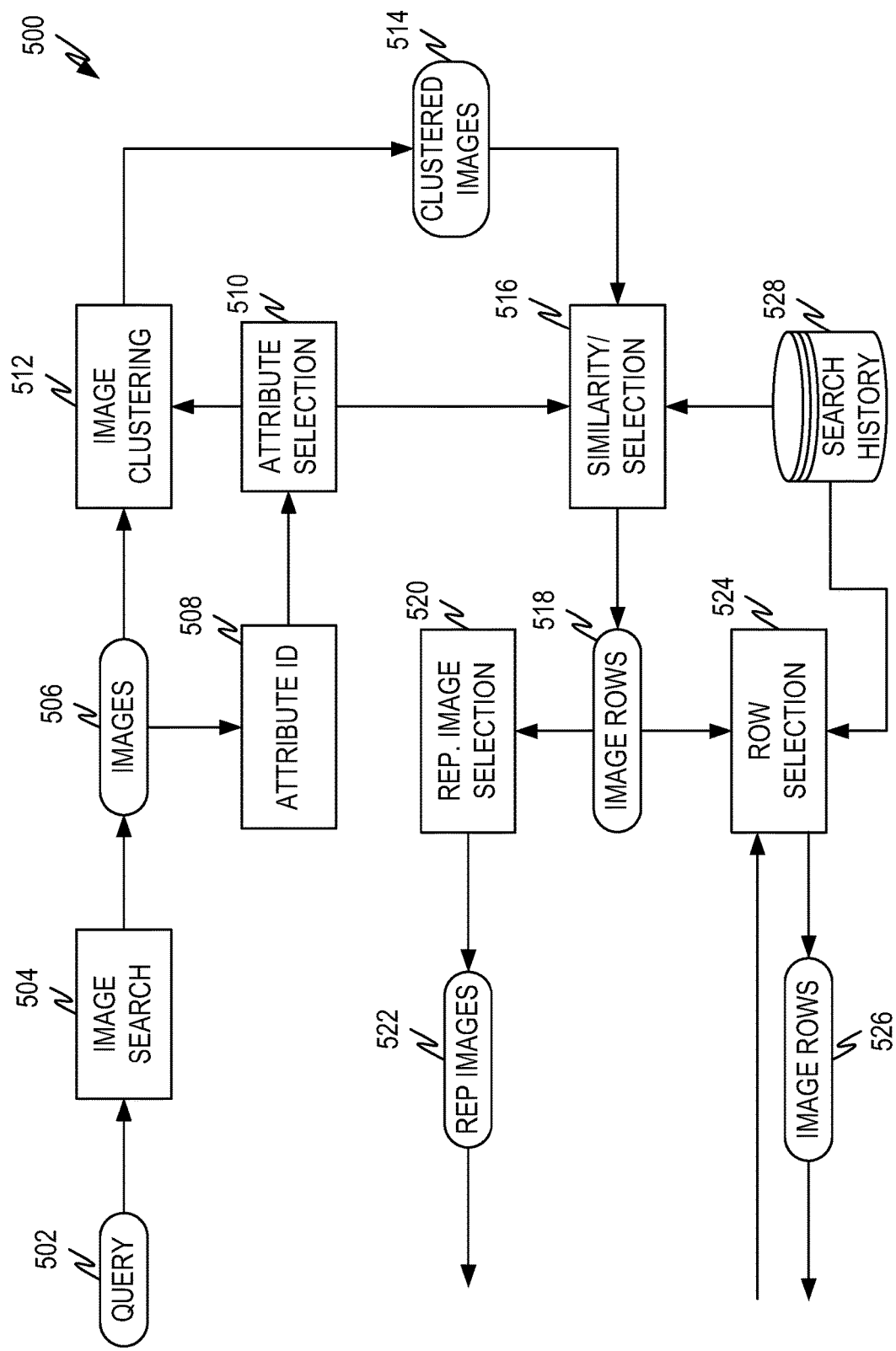
FIG. 5 illustrates an example architecture according to some aspects of the present disclosure.

FIG. 5 illustrates an example architecture 500 according to some aspects of the present disclosure. As discussed herein, a query 502 is received by the search service which performs an image search 504 to identify a plurality of images that are relevant to the query 502. The images can be for different objects (items), with a different number of images for each item. For example, if a user enters "SUVs" as a query, the images can be of SUVs from multiple manufactures, multiple models, and so forth. For a more focused query, such as "Mazda® SUVs" the images can be of different models of Mazda® SUVs. Furthermore, images can comprise associated attributes, which can be indicated in associated metadata. Thus, an attribute value showing the manufacture, an attribute value showing the model, and so forth can be stored in metadata associated with a particular image. Any number and/or type of attributes can be stored in the metadata, depending on the image.

In accordance with embodiments of the present disclosure, a subset (all or less than all) of images 506 are selected for consideration. Any number of images can be selected as the subset 506, however, in some embodiments the number of images selected for consideration are limited to some number, N, for reasons of execution speed and/or other engineering considerations. In a representative embodiment, images for 20 or fewer items are selected, with 30 or fewer images for each item, for a total of less than about 600 images. In other embodiments, a different number of images can be selected for consideration.

Attribute identification process 508 identifies a set of image attributes. These attributes are used in the image selection process as described below. Image attributes can be any attributes associated with, or identified in, the image. Image attributes can be stored in metadata or can be determined through examination/evaluation of the image as described herein.

The set of image attributes identified by attribute identification process 508 can comprise any number or type of attributes. Some attributes are used in one use case and not in another, thus which attributes are utilized and/or relevant can depend on the use case.

In some instances, image attributes can be stored as metadata associated with the image. Attributes stored in metadata associated with an image often describe and/or define the content of the image, the setting of the image, and/or other aspects of the image. For example, in some instances the attributes identify the item in the image. In other instances, attributes can describe aspects about the image, such as the color of the item in the image, the view orientation of the item in the image, the background of the image, and/or so forth.

In instances where attributes are not available in metadata associated with the image, the attributes can be determined using machine learning and/or other methods as described in greater detail below.

A subset of the set of image attributes identified and/or determined by attribute identification process are selected and broken into a set of varying attributes and a set of consistent attributes (also referred to as common attributes and/or non-varying attributes) by attribute selection process 510. Which attributes are selected and placed in the set of common attributes and/or set of varying attributes will depend on the use case.

As discussed above, two example use cases are when the system presents a set of images that are visually similar images of different items and when the system presents a set of images that are of the same item, but are visually different in one or more selected attributes. Thus, the set of images can be separated into a fixed (also referred to as a consistent) set if attributes and a varying set of attributes.

For a use case where visually similar images of different items are presented, the consistent set of attributes can comprise a combination of visual attributes that should be the same or similar across the images such as item color, item view angle, image background, and so forth. The consistent set of attributes can also comprise attributes that describe the item in the image that should be held constant. For example, if the user searches for different items from a particular manufacturer, the manufacturer would be one of the attributes that is in the consistent set of attributes. This is the case where a user enters the query "Mazda® SUVs". The user intent can be interpreted as wanting different models of SUV from a single manufacturer. In another example, where the user searches for "jointer planer combination machines" the intent is to find jointer planer combination machines from one or more manufactures. The constant set of attributes can include "jointer planer combination" as a "type" of machine that should be presented. In general, the user query can contain hints of attributes that should be held constant.

The varying set of attributes can comprise attributes that vary across images in a deliberate fashion. For example, where the user searches for "Mazda® SUVs" the model of SUV would be a varying attribute. In the "jointer planer combination machine" example, the varying attributes can comprise one or more manufacture-model combinations. Embodiments of the present disclosure can identify attributes and/or attribute combinations that vary across images and that describe different items that are to be main "categories" for the set of images.

In the present disclosure, an "attribute combination" should be interpreted as a combination of two or more attributes. Thus, both "Mazda® CX-9" and "jointer planer combination" can be an attribute combination within the context of the present disclosure.

In the first use case, the goal is to present visually similar images of different items. The attribute(s) that form the varying attributes define the items. For example, in many instances a manufacturer-model attribute pair defines a particular "type" of item. In some instances, additional attributes further define the item(s). For example, in the case of a query "used 4×4 vehicles" it may be desirable to have an attribute combination of "manufacturer-model-year" or "manufacturer-model-price" or "manufacturer-model-mileage" or any other attribute combination that defines the items that will be presented. The combination of attributes that define items are the set of varying attributes in the first use case where it is desirable to present different items with similar visual aspects.

In a second representative example use case, images of a single item are presented with the presented images visually varying in some fashion, the set of constant attributes comprises the combination of attributes that describes the item presented. As noted, this can comprise any attribute or combination of attributes that describe the item, such as manufacturer-model, manufacturer-model-year, and/or any combination of attributes that define the item presented.

The set of varying attributes can comprise any attribute or combination of attributes that are varied in the images presented to the user. For example, in one instance, images of the same vehicle with different colors, different options, different visual orientation, and/or other differences can be presented. The set of varying attributes thus comprise the attributes and/or attribute pairs that will be varied across the images.

Image clustering process 512 clusters the subset of images based on the set of varying attributes. Examples of how this operates are presented below. The output of the image clustering process 512 is a plurality of image clusters 514, each of which have at least one common attribute. For example, in a use case where different items having visually similar images presented, the clusters would include a set of images for each item to be considered. As another example, in a use case where the same item is presented with different colors, the clusters would include a set of images for each color to be considered. The image clustering process 512 takes as an input the set of varying attributes from attribute selection process 510 and produces a plurality of image clusters, one for each value of the varying attributes that will be considered. Using the examples above, in the case where the varying attribute set comprises color, each cluster is of a different color and all images in the cluster are of a common color. In the case where the varying attribute set comprises attributes that describe the item, each cluster is of a different item and all images in the cluster are of common a common item.

Similarity/selection process 516 receives the set of common attributes from attribute selection process 510 and the plurality of image clusters and selects an image from each cluster that is similar with respect to the set of common attributes and places the selected images into an "image row." Thus, the similarity/selection process 516 produces a set of image rows 518, where each image row comprises an image from each cluster that is similar to other images in the row with respect to the set of common attributes. This process is explained in greater detail below.

In some embodiments, a representative image can be selected from one or more image rows 518 by representative image selection process 520. The representative images 522 can be presented to the user for example as illustrated as 312 in FIG. 3. The representative images 522 can give the user a visual indicator of how the images of a particular image row will look. Additionally, or alternatively, the representative images can be selected by the user to cause display of the image row associated with the representative image.

Representative image selection process 520 can select representative images based on one or more selection criteria. For example, as explained in greater detail below, each row can have an associated selection metric. The top M image rows can be selected based on the selection metric and a representative image selected from each of the top M rows to form the set of representative images 522.

The representative image can be selected from among the images in an image row based on one or more selection criteria. For example, the image that has a highest relevance score (e.g., indicating relevance to the user query) can be selected as representative image. In another example, the representative image can be selected based on which image cluster the representative image came from. In yet another example, the image can be randomly selected from the images in the image row. Any other selection criteria can also be used such as a centroid measure from the cluster. For example, selecting images with a plain white background since that would be near the centroid of the cluster.

Row selection process 524 can select an image row to be displayed. When a user selects a representative image, row selection process 524 can return the associated image row 526. In another example, when a representative image has not been selected, or when representative images are not presented/used, the row with a highest and/or lowest score can be selected. In such an example, each image can have an associated similarity score, as described below, and the row with the highest aggregate similarity score can be presented. In yet another example, a plurality of rows can be selected and presented based on the aggregate similarity scores of the rows. In this example, the top L rows with the highest aggregate similarity score can be presented. In yet another aspect of this example, rows with an aggregate similarity score can be presented. In yet another example, search history 528 can be used, such as selecting an image with a high popularity rating (e.g., an image looked at by a large number of people) or an image that the current user has looked at frequently. Other criteria can also be used.

Figure 6:
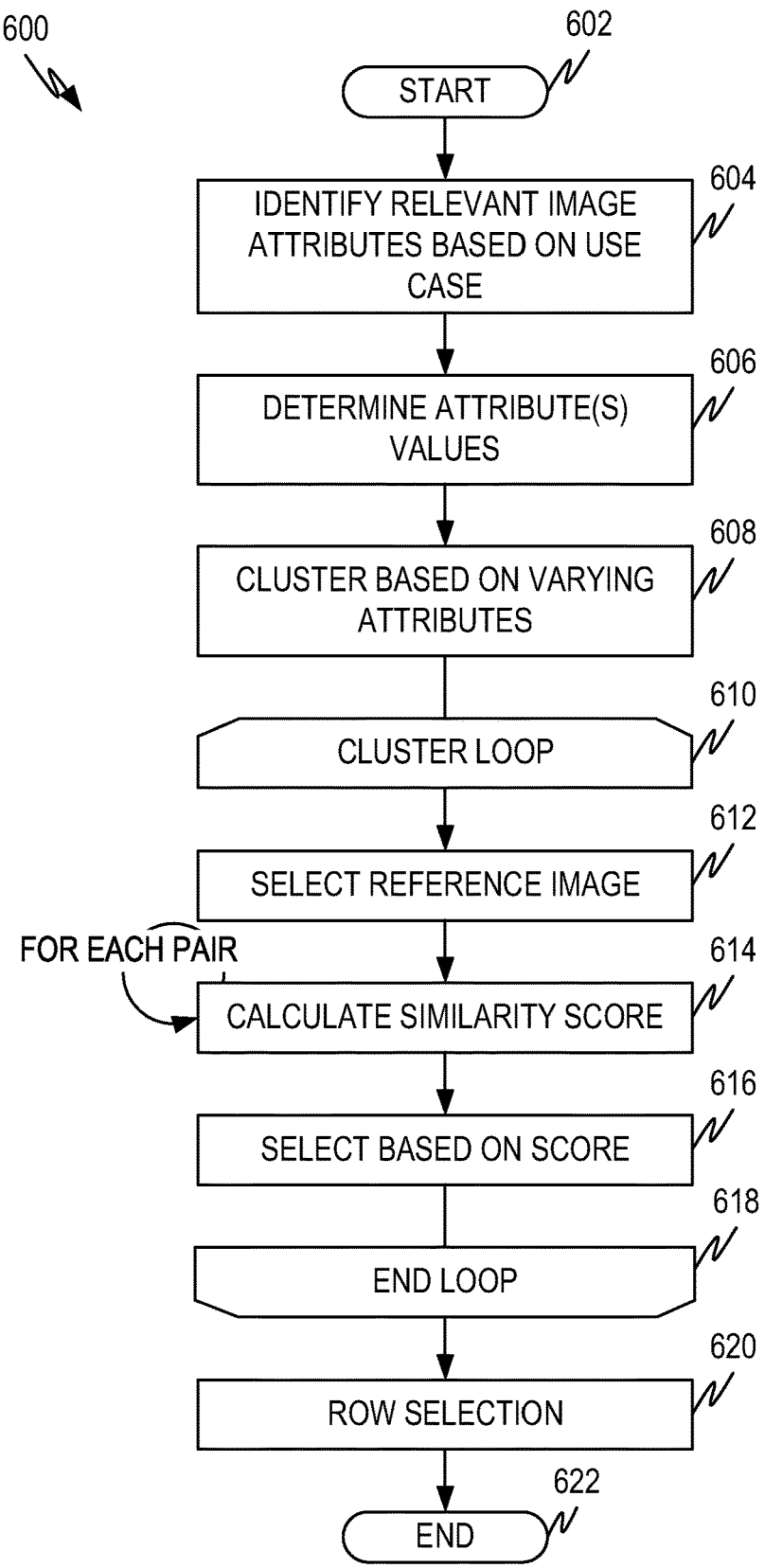
FIG. 6 illustrates an example flow diagram illustrating image selection according to some aspects of the present disclosure.

FIG. 6 illustrates an example flow diagram 600 illustrating image selection according to some aspects of the present disclosure. The flow diagram begins at operation 602 and proceeds to operation 604 where the relevant image attributes are determined and identified for the set of images that are to be placed into image rows (e.g., images 504 of FIG. 5) based on the use case. What attributes are relevant to placing images in image rows will be dependent upon the use case. Where images for different items are to be displayed in visually similar rows, the attributes that are relevant will include attributes that define the item categories that the items will be clustered into (set of varying attributes) and attributes that determine visual similarity (set of common attributes).

In this use case, the attributes that define the item categories that the items will be clustered into (set of varying attributes) are those attributes that define the different items. This can be attributes that identify different items to the desired level of specificity. Thus, the set of varying attributes can comprise one or more of: manufacturer, model, features/options, year of manufacture, country of manufacture, and/or any other information that identifies items to the desired level of specificity.

In this use case the attributes that determine visual similarity (set of common attributes) can include one or more of color, view orientation, background color, background type, features/options, zoom level, and/or any other attributes that define the visual similarity to the desired level of specificity.

In some instances, the set of common attributes need not be specifically identified because visual similarity can be determined with an appropriately trained machine learning model as described below. When machine learning models are used, the attributes that define visual similarity as well as the relationship between attributes that define visual similarity are implicitly taken into account by the trained machine learning model.

In a use case where the same item with different aspects will be displayed, the set of varying and the set of common attributes can comprise the same and/or different combination of attributes as the above use case. For example, if the same item but different colors are to be presented, the set of varying attributes will comprise colors while the common attributes can comprise the attributes that define visual similarity.

Again, in some instances, the set of common attributes need not be specifically identified because visual similarity can be determined with an appropriately trained machine learning model as described below. When machine learning models are used, the attributes that define visual similarity as well as the relationship between attributes that define visual similarity are implicitly taken into account by the trained machine learning model.

Operation 606 determines attribute values for the relevant attributes, to the extent that they need to be determined. As noted herein, in some instances, machine learning models are trained to account for relevant attributes, their values, and/or relationship to other relevant attributes.

Where attributes and/or their values need to be specifically identified, in some instances relevant attributes are in metadata associated with the image, and in other instances relevant attributes can be extracted by analyzing the image. Determining attribute values through analyzing the image is discussed in greater detail below.

Operation 608 clusters the images based on the set of varying attributes, with a single cluster for each value of the varying attribute(s). For example, if the item is the varying attribute, each cluster will include all the images for a particular item. As another example, if the color is the varying attribute, each cluster will include all the images where an item has the same color. In other words, each cluster contains a single category of images, where category is defined by the values of the varying attribute(s).

Any clustering and/or sorting algorithm can be utilized in conjunction with operation 608. For example, where the attributes that define the categories into which the images will be sorted and the values for the attributes are known, a sorting algorithm where images are sorted into clusters based on the attributes and values can be used. Attributes and values of each image is considered and placed into cluster with images having the same/similar attributes/values.

Additionally, or alternatively, any clustering algorithm such as K-means clustering, mean-shift clustering, Density-Based Spatial Clustering of Applications with Noise (DB-SCAN), Expectation-Maximization (EM) Clustering using Gaussian Mixture Models (GMM), Agglomerative Hierarchical Clustering, and/or other clustering models can be used to cluster the images into clusters based on the varying attributes.

Operation 610 begins a loop that considers each cluster in turn and creates image rows that include an image from each cluster based on similarity of that image to at least one other image in the image row. The operations in the loop (612, 614, 616) represent a greedy algorithm that selects images based on pairwise similarity. However, other algorithms that minimize or maximize an aggregate similarity score can be used. Additionally, or alternatively, machine learning models trained to determine visually similarity for particular contexts. Context in this sentence means one or more attributes that should be common between images and that represent visual similarity. Thus, the context is the set of common attributes, so that the closer two images are with regard to the set of common attributes, the higher the resultant similarity score is for the two images.

Operation 612 selects a reference image from a first image cluster. The reference image is the next image under consideration and will be the image that images from other clusters will be compared to in order to determine visual similarity based on the set of common attributes.

Operation 614 calculates a pairwise similarity score between the reference image and images of a second image cluster. The similarity score can be calculated by comparison between the values of the set of attributes in the common attribute set. For example, if the common attribute set comprises item view orientation, item color, and predominant background color, the attribute values for these attributes for the reference image and each image in the second image color can be compared in a pairwise manner. The similarity score can then be a weighted aggregation of the relative similarity between each value for each attribute in the common attribute set. When determining matching for attribute values, a degree of matching can be taken into account. For example, when comparing item view orientation, the closer the view angle is, the higher the match can be. As a rough example, consider a vehicle view orientation that can have a value of a front left quarter view, a front view, a right quarter view, a left side view, a back left quarter view, a back view, a back right quarter view, and a right side view. Matching criteria can be such that the more different a view is, the lower a matching score. Thus, front views are more similar than a front view and back view, and so forth. Each pair of views can be assigned a number between 0 and 1, inclusive, so that when the two view orientations are the same, the match score is assigned a 1, and when the two orientations are opposite (e.g., a front view and a back view), the match score is assigned a 0. Other pairs are assigned values between 0 and 1, depending on how close the view is.

For color value attributes, colors that are more similar, such as different shades of a particular color or different colors that are of a similar shade, can be given higher similarity scores than colors that are less similar, such as colors that different shades or larger contrasts between colors such as black and white.

The similarity score can be a weighted aggregation (such as a weighted sum) of each of the individual match scores. In some instances, the weighted aggregation can be normalized to give the resultant similarity score a value between 0 and 1, inclusive. A value closer to 1 will mean the images are more similar, and a value closer to 0 will mean the images are less similar.

Additionally, or alternatively, trained machine learning models can be used to calculate a similarity score between images. The machine learning models can be trained based on particular common attribute sets. For example, a machine learning model can be trained for the common attribute set comprising item view orientation, item color, and predominant background color. In another example, a machine learning model can be trained using item view orientation and background color. Thus, any particular common attribute set that defines what attributes are to be similar can be used to train a machine learning model. The common attribute set can then be used to select which machine learning model will be used to calculate similarity scores.

When using machine learning models, a pair of images (e.g., the reference image and an image from a second image cluster) are presented to the trained model and the output is a similarity score which indicates the similarity between the two images. Thus, operation 614 can utilize a trained machine learning model in some embodiments in addition to, or as an alternative to, the attribute matching method described above.

Operation 614 is repeated for each image in the second image cluster and operation 616 selects the most similar image in the second image cluster based on the pairwise similarity scores. For example, the most similar image can be the images that has the highest similarity score. As another example, the most similar image can an image with a similarity score that exceeds a threshold. As yet another example, the most similar image is the image with the highest similarity score provided that score exceeds a threshold. Other ways to select a most similar image based on similarity score can also be used.

The loop is repeated until all images in all clusters have been evaluated or until a sufficient number of image rows are created. Image rows comprise images from two or more clusters that are similar in the common attribute set but different in the varying attribute set. The examples presented below with respect to FIGS. 7-9 will serve to clarify what image rows are and how the method of FIG. 6 and/or architecture of FIG. 5 serve to create image rows.

As the loop is repeated, variations are possible. For example, in one embodiment the reference image is kept the same so that images in all clusters are compared to the same reference image in the first cluster until an image row is created. Then the next reference image in the first cluster is selected and the loop repeated until the next image row is created. This can be repeated until the images of one or more clusters are exhausted or until a desired number of image rows are created.

In another variation, the reference image is set to the image selected in operation 616 for the next iteration of the loop until an image row is created. Then the next reference image in the first cluster is selected and the loop repeated until the next image row is created. This can be repeated until the images of one or more clusters are exhausted or until a desired number of image rows are created. This variation is a "greedy" variation.

Once all image rows have been created, execution proceeds to operation 620 where an image row is selected based on one or more selection criteria. As described herein, an image row can be selected based on a user selecting a representative image in the image row. Additionally, or alternatively, an image row can be selected based on minimization and/or maximization of a selection score. For example, a selection score can be a sum of all the similarity scores in an image row. The row that is has images that are most similar to each other, will be the row with the highest sum of the similarity scores. Other selection scores can also be used to select which row to display.

Execution ends at operation 622.

Although the description in FIG. 6 has been presented where images are selected to be visually similar (e.g., operation 616 selects a most similar image), the operation of FIG. 6, and other figures described herein, can be modified to select a least similar image or an image with a similarity score below a threshold. Such an embodiment can be used, for example, where a system presents a set of images that cover all the differences/variations of an item. If a user desires to see all the aspects that would differentiate an item or a set of items, it can be difficult for a user to get a sense of completeness that they have seen all the various attributes that differentiate them. For example, a user wants to know that they have seen all the different colors a model of car comes in for a particular year and wants to see them lined up against each other.

In some embodiments, it may be sufficient for the images for a particular item can be clustered by color (e.g., the set of varying attributes comprises color) and then images that are otherwise visually similar in view angle and/or background color can be selected (e.g., the set of common attributes comprise view angle and/or background color). In other embodiments, it may be desirable to get as much visual distinction between the images as possible. In these embodiments, the set of varying attributes can comprise color and the set of common attributes can comprise view angle and/or background color. The image rows, however, are selected so that the least visually similar images are picked from each cluster, or images that have a similarity score below a particular threshold.

Figure 7:
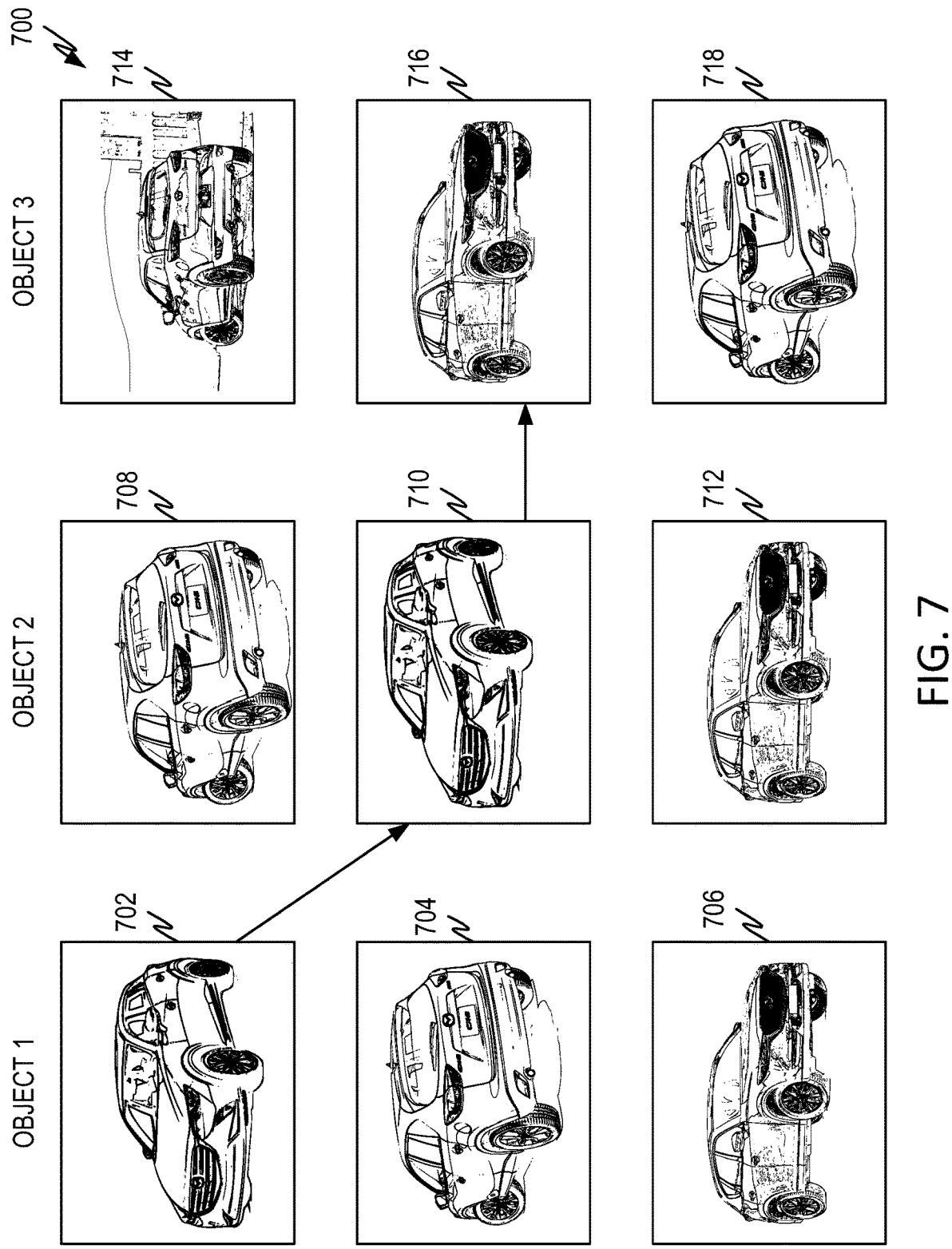
FIG. 7 illustrates an example image selection process according to some aspects of the present disclosure.

FIG. 7 illustrates an example image selection process 700 according to some aspects of the present disclosure. The example in the figure will help illustrate how the architecture of FIG. 5 and/or the flow diagram of FIG. 6 operate to take a collection of images, cluster them by a varying set of attributes and then utilize a common set of attributes to produce image rows that are visually similar in the common attribute set and different in the varying attribute set.

In this example, the varying attribute set comprises the item and the common attribute set comprises item view angle, background color, and/or item color. Thus, each image has associated attributes that comprise an item descriptor, a view angle, background color, and/or item color. These attributes can each have a value that is either already associated with the image or which is extracted through image analysis as described herein, or any combination thereof.

As discussed in conjunction with the architecture of FIG. 5 and/or the flow diagram of FIG. 6, the varying attribute set is used to cluster the images into different clusters. Since the varying attribute set comprises the item descriptor, the images are clustered into clusters by item descriptor. If the images are of SUVs, the clusters would be the different SUVs represented in the set of images obtained from the search engine. In FIG. 7, the resultant image clusters have item descriptors of Object 1 comprising images 702, 704 and 706, Object 2 comprising images 708, 710, and 712, and Object 3 comprising images 714, 716, and 718.

Although the example of FIG. 7 has an equal number of images in each cluster, in some embodiments the resultant clusters can have different numbers of images in some or all of the clusters.

A reference image is selected in one of the clusters. In this example, image 702 is selected from the Object 1 cluster as the first reference image. Pairwise similarity scores are the calculated for each image in a second cluster. In this example, pairwise similarity scores for images 708, 710, and 712 of the Object 2 cluster are calculated with image 702.

As discussed herein, the pairwise similarity scores can be calculated from an aggregation of match scores of the values of the attributes in the set of similar attributes and/or by presenting the pairs of images to a machine learning model trained using the set of similar attributes, as described herein. In this example, image 710 is selected as having the highest similarity score to image 702.

Depending on the variation utilized in the embodiment, the reference image can be kept as image 702 or the reference image can be set to the selected image 710. Suppose, the reference image is changed to image 710 for the next iteration of the method. In this case, the next cluster (e.g., a cluster from which no image has been selected for this image row) is selected. In this example, this would be the Object 3 cluster. Thus, pairwise similarity scores are calculated for images 714, 716, and 718 with image 710. Suppose that the highest similarity score is image 716. Thus, image 716 will be added to the image row.

Since there are no more clusters to consider, the created image row comprises image 702, image 710, and image 716. The method can be repeated starting with image 704 as the reference image. In an example, the next image row would comprise images 704, 708, and 718. Repeating the method again with image 706 as the reference image can yield the final image row as comprising images 706, 712, and 714.

In the example, as the image rows were created, the images already placed into image rows were removed from further consideration. Thus, the image rows each comprise unique images. In other embodiments, the images added to an image row are not removed from further consideration. In this embodiment, some images may appear in more than one image row while other images may not appear in any image rows.

In the example, the stopping criteria is that all images in the references cluster (e.g., Object 1 cluster) are assigned to image rows. However, different stopping criteria can be used, such as a designated number of image rows have been created.

If some or all of the clusters have a different number of images, the method still works as described. The stopping criteria may be different, however. In a first example, the method can be stopped once the cluster with the fewest number images has had its images assigned to an image row. In a second example, the method can be stopped once a designated number of images have been created. In yet another example, the method can be stopped once a "reference" cluster has had its images assigned to an image row. In this latter example, clusters having a number of images less than the reference cluster can have their images "reused" (e.g., not removed from consideration when they are assigned to an image row) until all the images in the reference cluster are assigned to an image row. In a variation of the latter example, a subset of the clusters has their images reused.

Figure 8:
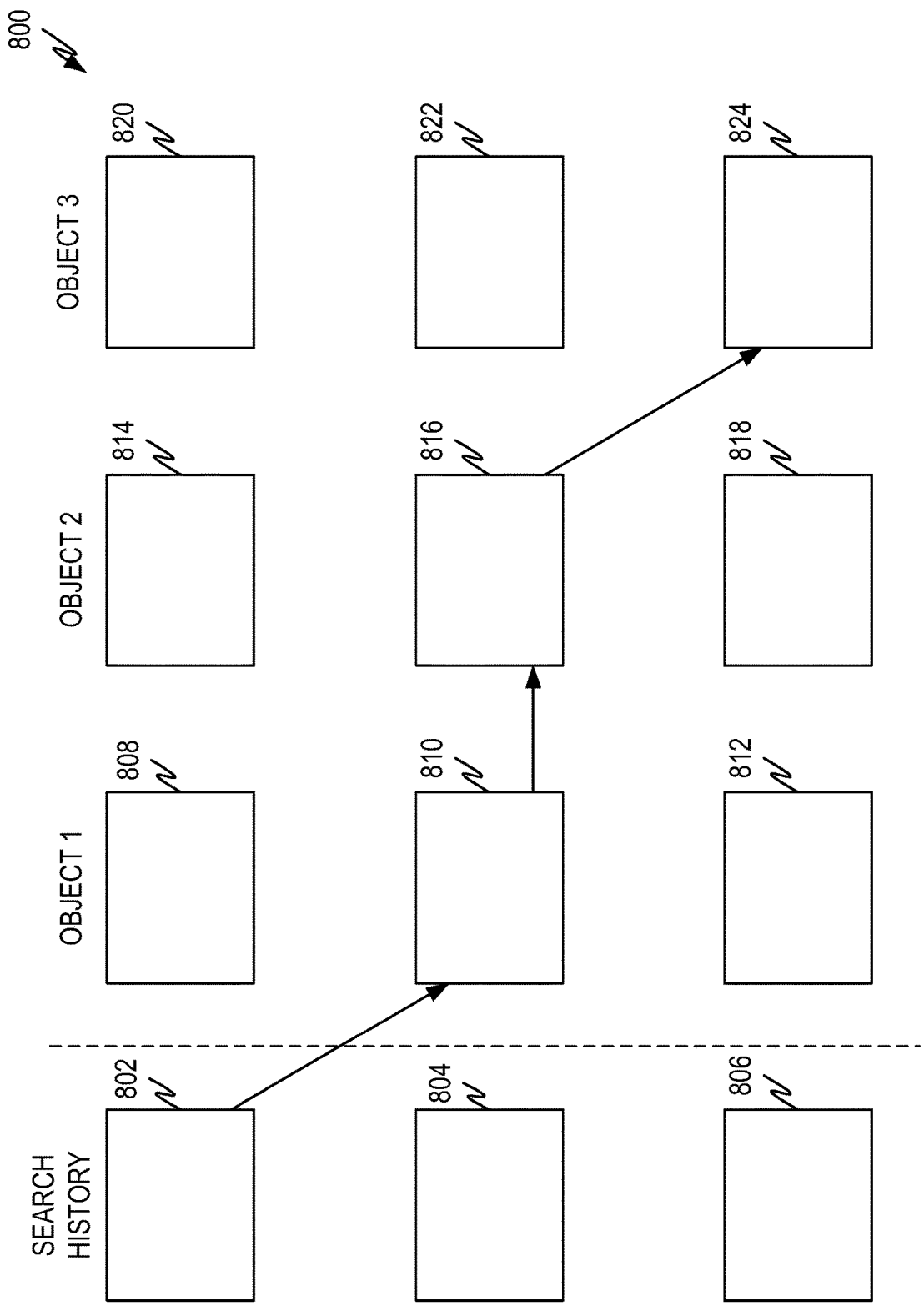
FIG. 8 illustrates an example image selection process according to some aspects of the present disclosure.

FIG. 8 illustrates an example 800 image selection process according to some aspects of the present disclosure. In some embodiments, it can be desirable to take into account a user's search history and/or click history to help identify which images a user is more likely to be interested in. FIG. 8 illustrates a mechanism for incorporating search/click history into the image selection process in order to have greater personalization to a user.

Users often return to queries that they have submitted before. For example, a user researching vehicles to purchase may have several research sessions where they compare different vehicles. As results are returned and as a user interacts with the results, the search history and/or click history can provide clues as to what might be of more interest to a user for the current search. Images that a user has searched for and/or interacted with during prior sessions can be saved in a search history and/or click history, which will be referred to herein as a search history.

When a user submits a query and a set of images are returned, the image selection process can extract images that were previously of interest from a search history. These images can be "appended" to the set of clustered images as a hidden cluster and used to identify visually similar images in the set of images returned from the search engine. In FIG. 8, images that are relevant to the current query are extracted from the search history and placed in a "search history" cluster as illustrated in FIG. 8.

As a representative example, the Search History cluster comprises images 802, 804, and 806. The Object 1 cluster comprises images 808, 810, and 812. The Object 2 cluster comprises images 814, 816, and 818. The Object 3 cluster comprises images 820, 822, and 824. In this example, the varying attribute set comprises the object identifier.

A reference image 802 is selected from the search history cluster. A pairwise similarity score is calculated as previously described for each image in the Object 1 cluster based on the attributes in the common attribute set. Based on the similarity score, the most similar image is selected. In this example, image 810.

The reference image can then either remain constant, or be set at image 810, and the process is repeated for the images in the Object 2 cluster. Based on similarity score, in this example, image 816 is selected as the most similar image.

The reference image can then either remain constant (e.g., at 802 or 810) or can be set to images 816 and the process is repeated for the images in the Object 3 cluster. Based on the similarity score, in this example, image 824 is selected as the most similar image.

The created image row would then comprise images 810, 816, and 824. Images from the search history are not included in the created image row in this embodiment, although they can be included in the created image row in other embodiments.

The beginning reference image 804 is selected for the next image row and the entire process completed. This continues until the desired stopping criteria is reached as explained above.

Figure 9:
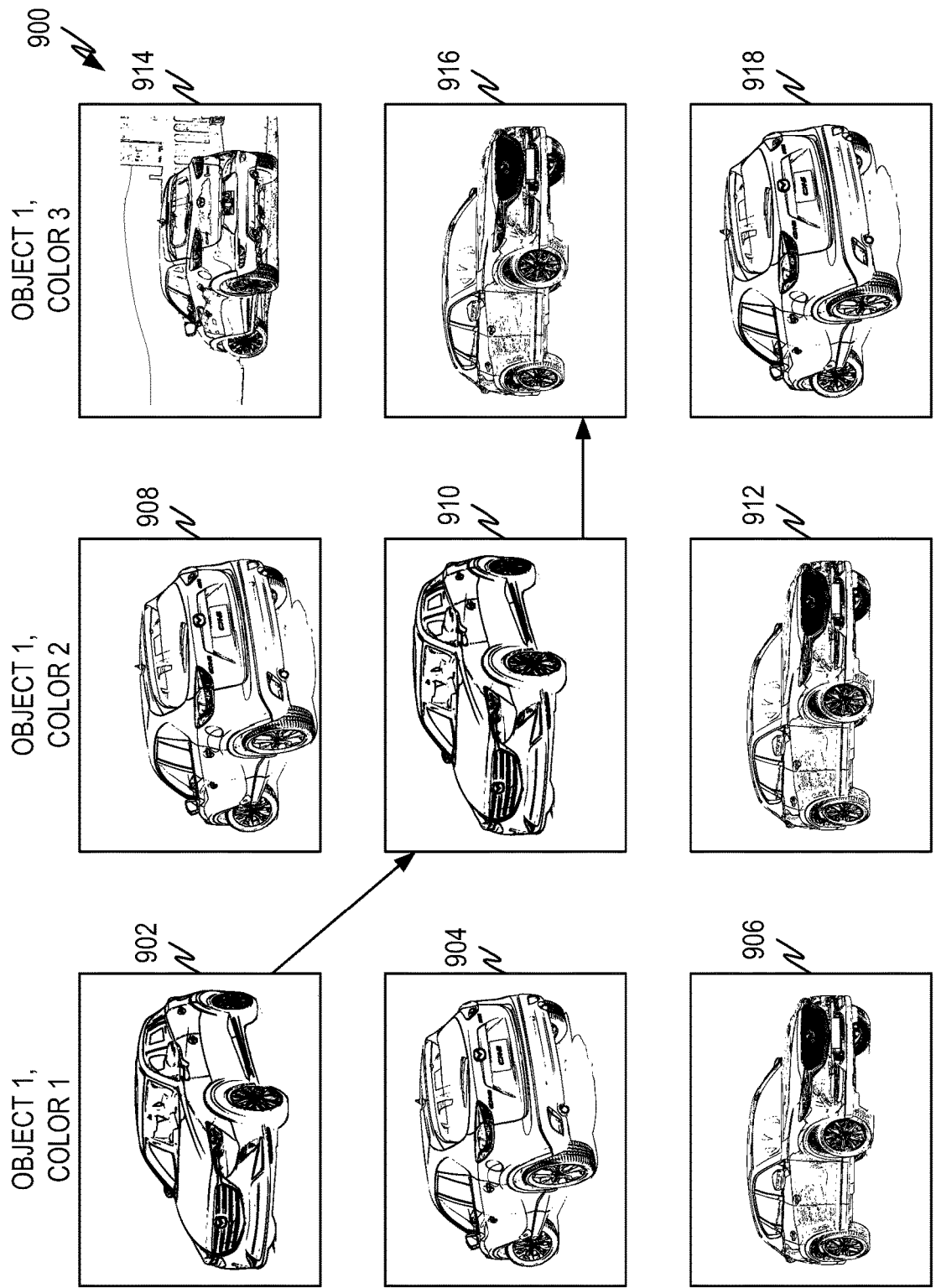
FIG. 9 illustrates an example image selection process according to some aspects of the present disclosure.

FIG. 9 illustrates an example 900 image selection process according to some aspects of the present disclosure. In this example, the varying image set comprises the item color, while the item descriptor is held constant. This is a use scenario where the images selected are visually similar in some aspects but are varying in color. For example, vehicles of the same make and model, but with different colors.

In this instance, the item descriptor that will be used for the process can be selected based on what is in the query, such as was previously described above. Thus, if the user searches for "Model Y SUVs," it can be interpreted that the user wants to see various aspects of Model Y SUVs. The attribute to vary, in this representative example, color can be inferred by the user search history, by user input, by user interaction with presented images, by popularity, and/or in some other fashion.

Thus, the set of images from the search engine can be pre-processed to eliminate all images that are not of Model Y SUVs. The remaining images can be clustered by item color. Thus, in the representative example, the images are clustered in Object 1, Color 1 cluster comprising images 902, 904, and 906. Object 1, Color 2 cluster comprising images 908, 910, and 912. Object 1, Color 3 cluster comprising images 914, 916, and 918.

Then using the methods and/or architectures previously described, a reference image is selected (902 in this example) from a cluster, and pairwise similarity scores for another cluster are calculated and the most similar image (910 in this example) and that image is added to the image row. The process is repeated as explained herein to select another image to add to the image row (916 in this example).

The whole process is repeated with a different reference image and so forth until the desired stopping criteria is reached.

In the example of FIG. 9, the result will be image rows that are visually similar, but where the items are different colors.

The examples of FIG. 7-9 can be repeated for any set of common attributes and any set of varying attributes.

Figure 10:
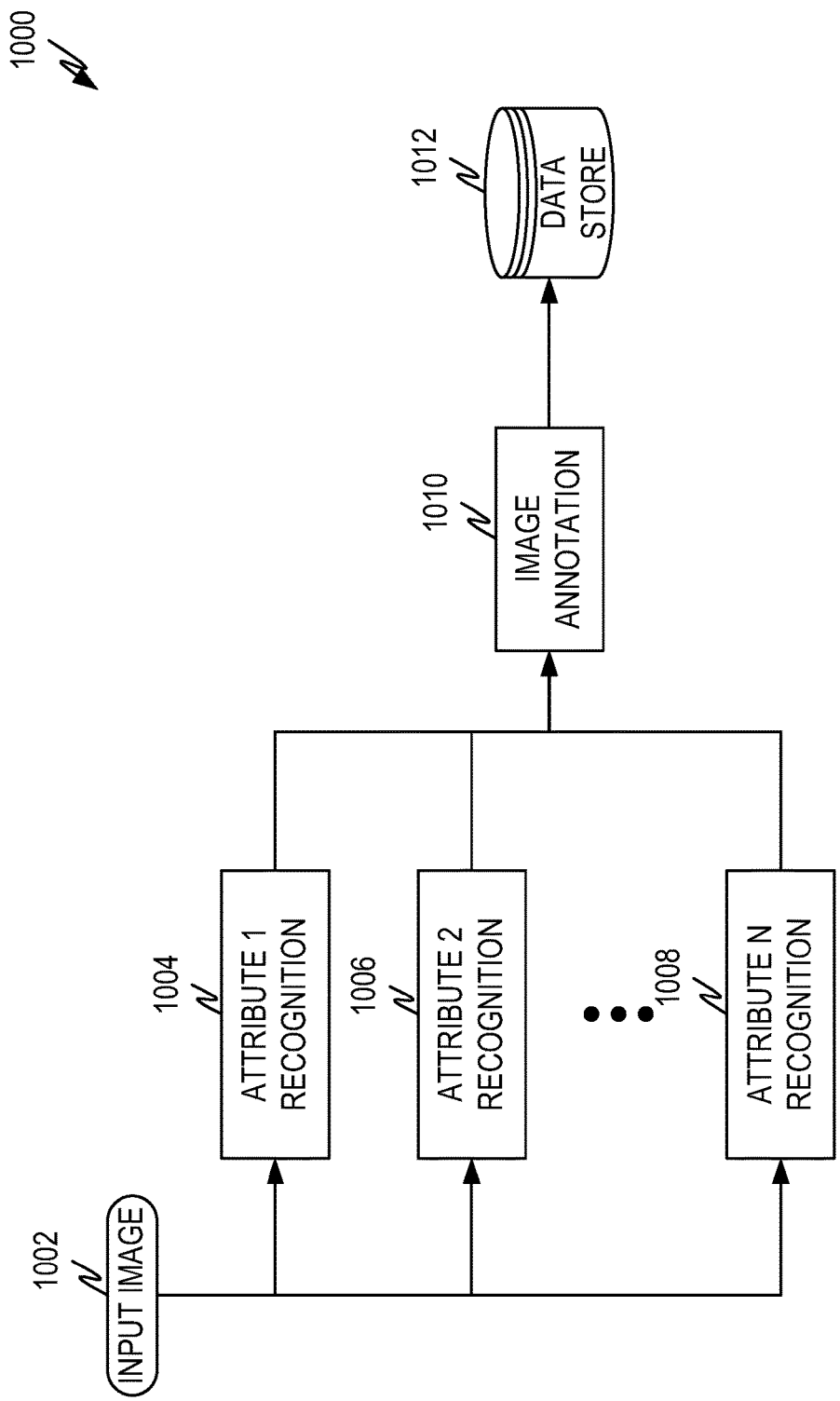
FIG. 10 illustrates an example attribute recognition architecture according to some aspects of the present disclosure.

FIG. 10 illustrates an example 1000 attribute recognition architecture according to some aspects of the present disclosure. As explained herein, in some instances the image is evaluated to identify values for one or more desired attributes. This process is illustrated in FIG. 10.

An image 1002 whose attribute values are to be identified is input into one or more attribute recognizers 1004, 1006, 1008, which each extract one or more attributes. The image can then be annotated by image annotation process 1010 and the results stored in a data store 1012 for later use. The process in FIG. 10 often occurs outside of run-time, such as in some offline manner. In this way, the annotation process need not be completed at run time. In other embodiments, the annotation using one or more attribute-value pairs can occur at runtime.

Attribute recognizers 1004, 1006, 1008 can comprise one or more mechanisms to identify a value for a particular attribute (or values for more than one attribute). Some values can be identified by direct inspection, while others use image processing techniques such as trained machine learning models to identify values for desired attributes associated with the image. As one representative example, item recognizers are known in the art and can be used to identify one or more items in an image. As another example, image captioners that create a caption which describes the image are known. Such captioners can help identify the subject of the image. Additionally, machine learning models can be trained to identify attributes such as predominant background color, whether the background is mostly a color or whether the background contains identifiable items (hills, roads, buildings, and so forth), item view orientation, predominant item color, and/or other attribute values.

Many of these are already known in the art, and such can be used. Others may require training of an appropriate machine learning model (or models) as described herein.

Figure 11:
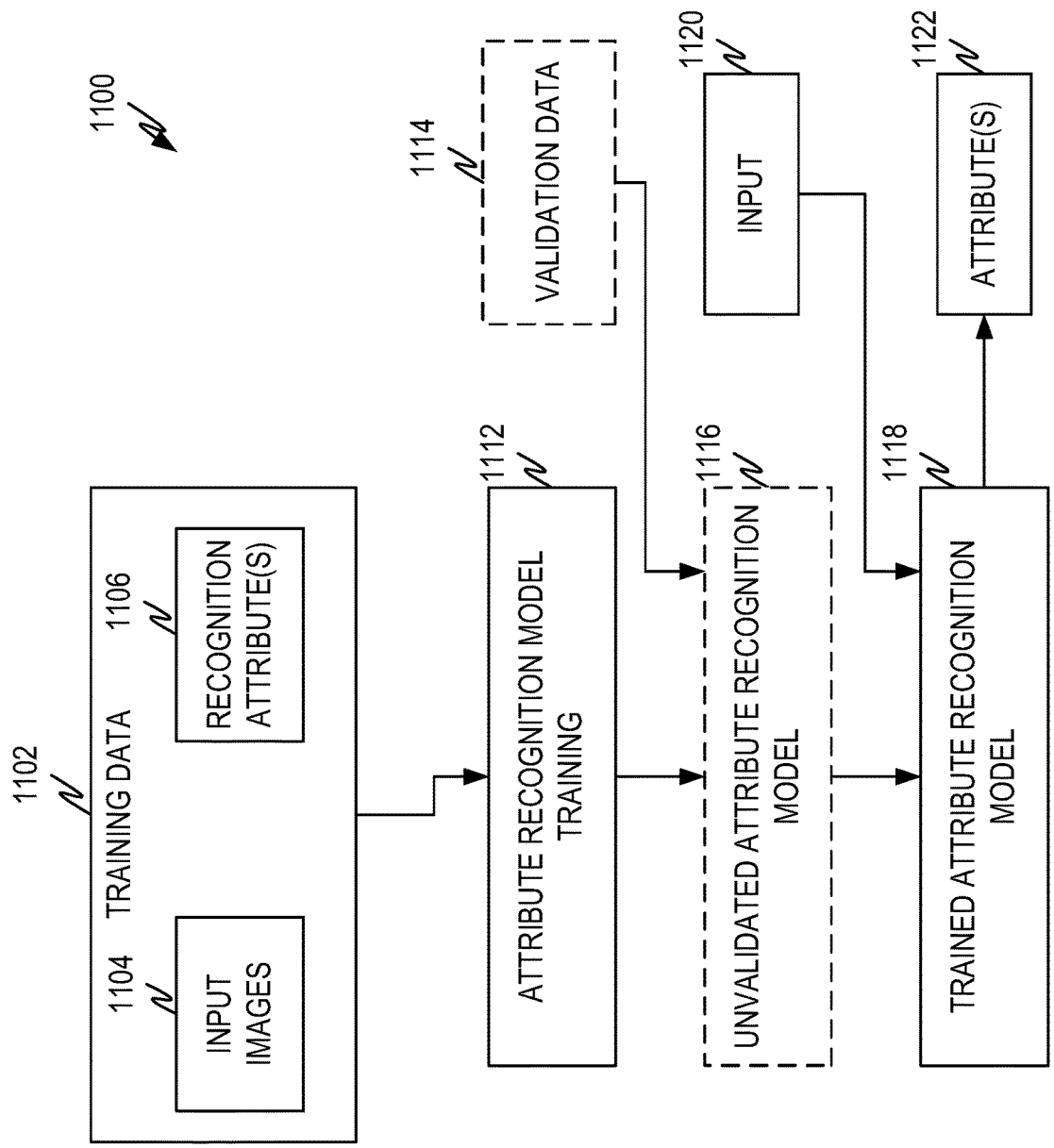
FIG. 11 illustrates an example of training an attribute recognition engine according to some aspects of the present disclosure.

FIG. 11 illustrates an example 1100 of training an attribute recognition engine according to some aspects of the present disclosure. In some example embodiments, machine learning models, also referred to as machine learning algorithms or tools, are utilized to identify attribute values as described herein.

Machine learning is a field of study that gives computers the ability to learn without being explicitly programmed. Machine learning explores the study and construction of models, that may learn from existing data and make predictions about new data. Such machine learning tools operate by building a model from example training data 1102 in order to make data-driven predictions or decisions expressed as outputs or assessments 1122. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for identifying attribute values.

Two common types of problems in machine learning are classification problems and regression problems. Classification problems, also referred to as categorization problems, aim at classifying items into one of several category values (for example, is the color of this object red or green?). Regression algorithms aim at quantifying some items (for example, by providing a value that is a real number) such as the similarity scores discussed herein. In some embodiments, example machine-learning algorithms provide attribute values. The machine learning algorithms utilize the image training data 1104 to find correlations among identified attributes and values 1106 that affect the outcome.

The machine learning models utilize features such as the attributes for which values are to be recognized 1106 for analyzing the data to generate assessments 1122. A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types.

The machine-learning algorithms utilize the training data 1104 to find correlations among the identified features 1106 that affect the outcome or assessment 1122. In some example embodiments, the training data 1102 includes annotated (also referred to as labeled) data. For example, images 1104 that have been evaluated, for example by a human, and the value of the desired attribute identified and associated with the image. For example, a machine learning model to be trained to recognize vehicle view angles may utilize training data comprising vehicle data that has been annotated with the vehicle view angle for each image.

With the training data 1102, the machine learning model is trained at operation 1112 using known techniques for the particular type of model being used. This typically involves a feedback type process where parameters (also called weights) in the model are successively adjusted until a desired level of accuracy is achieved. In some instance training is unsupervised, meaning the training utilizes unannotated input data. In some instances, the training is supervised meaning that the training utilizes annotated input data. The machine learning tool appraises the value of the features 1106 as they correlate to the training data 1104. The result of the training is the trained machine learning model 1116.

At this point the machine learning model 1116 is trained but is unvalidated. The model can be used directly or can be validated using a validation process. The validation process comprises sending validation data 1114 which is the same as data expected to be processed by the machine learning model with annotations that indicate the output that would be expected from the model. The actual output values from the model can be compared to the image annotation to see if the model produced the expected answer. The model can be said to be validated once a certain percentage of correct assessments are produced. For models that do not reach the desired level of correctness, retraining using more data may be in order.

When the machine learning model 1118 (validated or unvalidated) is used to perform an assessment, new data 1120 is provided as an input to the trained machine learning model 1118 and the machine learning model 1118 generates the assessment 1122 as output. For example, an image is evaluated to identify the value of one or more attributes.

Figure 12:
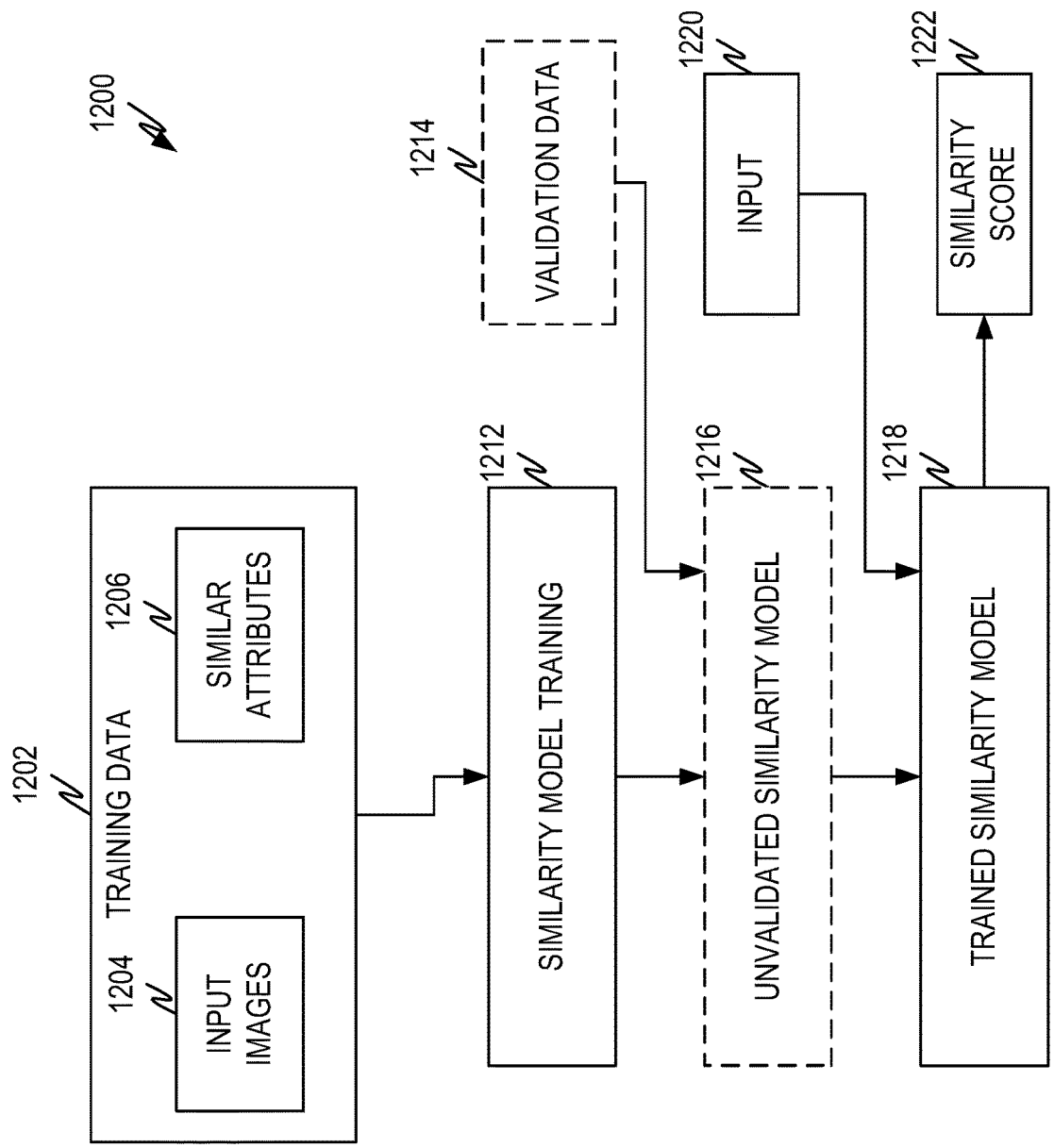
FIG. 12 illustrates an example of training a similarity scoring model according to some aspects of the present disclosure.

FIG. 12 illustrates an example 1200 of training a similarity scoring model according to some aspects of the present disclosure. The training of the similarity scoring model 1218 mutatis mutandis proceeds as described above in conjunction with FIG. 11.

In training the similarity score model 1218, the training data comprises image pairs that are similar with respect to a set of common attributes 1206. The images can be annotated with similarity scores if the model is trained using a supervised training method or can be unannotated if the model is trained using an unsupervised training method. Annotations for supervised training methods can include a binary similarity score (e.g., similar or not) or with a non-binary similarity score (e.g., a value on a scale such as 0 to 1, 1 to 5 stars, and so forth) or any other similarity measure. Annotations can be automated, can be assigned by human annotators, or can be inferred from a list of images ranked by similarity, and/or so forth.

Validation data 1214 is likewise image pairs that are similar and/or dissimilar. Similarly, input data 1220 is two images whose similarity is to be assessed and a similarity score 1222 calculated.

Example Machine Architecture and
Machine-Readable Medium

Figure 13:
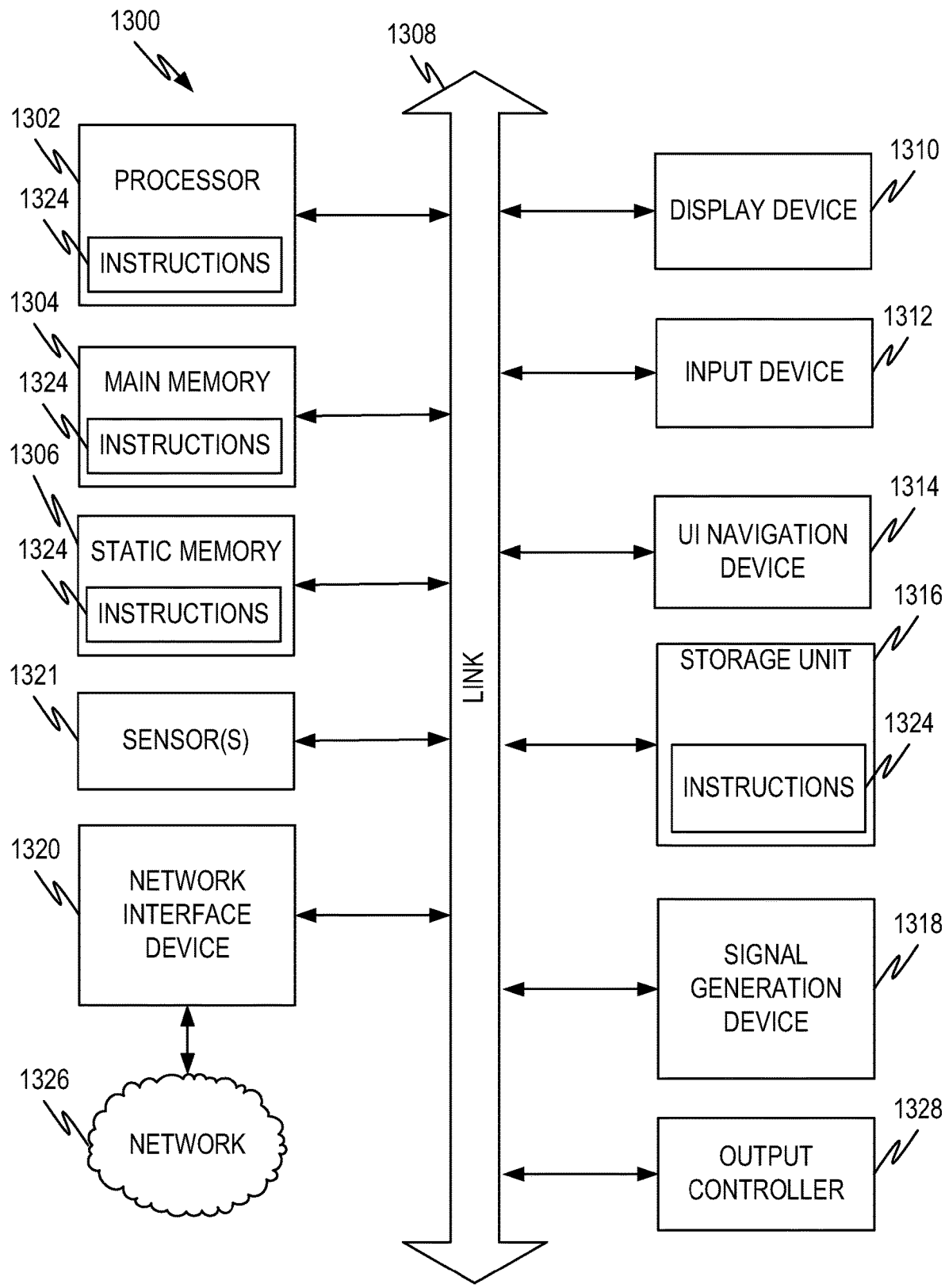
FIG. 13 illustrates a representative architecture for implementing the systems and other aspects disclosed herein or for executing the methods disclosed herein.

FIG. 13 illustrates a representative machine architecture suitable for implementing the systems and so forth or for executing the methods disclosed herein. The machine of FIG. 13 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 13 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1300 includes at least one processor 1302 (e.g., a central processing unit (CPU), a graphics processing unit (GPU), advanced processing unit (APU), or combinations thereof), one or more memories such as a main memory 1304, a static memory 1306, or other types of memory, which communicate with each other via link 1308. Link 1308 may be a bus or other type of connection channel. The machine 1300 may include further optional aspects such as a graphics display unit 1310 comprising any type of display. The machine 1300 may also include other optional aspects such as an alphanumeric input device 1312 (e.g., a keyboard, touch screen, and so forth), a user interface (UI) navigation device 1314 (e.g., a mouse, trackball, touch device, and so forth), a storage unit 1316 (e.g., disk drive or other storage device(s)), a signal generation device 1318 (e.g., a speaker), sensor(s) 1321 (e.g., global positioning sensor, accelerometer(s), microphone(s), camera(s), and so forth), output controller 1328 (e.g., wired or wireless connection to connect and/or communicate with one or more other devices such as a universal serial bus (USB), near field communication (NFC), infrared (IR), serial/parallel bus, etc.), and a network interface device 1320 (e.g., wired and/or wireless) to connect to and/or communicate over one or more networks 1326.

Executable Instructions and Machine-Storage Medium

The various memories (i.e., 1304, 1306, and/or memory of the processor(s) 1302) and/or storage unit 1316 may store one or more sets of instructions and data structures (e.g., software) 1324 embodying or utilized by any one or more of the methodologies or functions described herein. These instructions, when executed by processor(s) 1302 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1. A machine implemented method, comprising:
receiving a plurality of images identified in response to a query submitted by a user;
clustering the plurality of images into a plurality of clusters, images in each cluster having at least one image attribute in common;
selecting a references image in a first cluster;
calculating a similarity score for images in a second cluster;
selecting an image from the second cluster based on the similarity score;
creating an image row comprising the reference image and the selected image;
repeating the selecting and calculating operations for a new reference image selected from the first cluster until a stopping criteria es met;
selecting a display image row based on a selection metric calculated for each image row; and
causing display of the display image row.

Example 2. The method of example 1 further comprising:
setting the selected image as the reference image;
calculating a similarity score for each image in a third cluster;
selecting an image from the third cluster based on the similarity score.

Example 3. The method of example 1 or 2 further comprising:
identifying at least one attribute for a subset of the images in the first cluster, a subset of images in the second cluster, or both, using a trained machine learning model.

Example 4. The method of example 1, 2, or 3 wherein selecting the reference image is based on user search history.

Example 5. The method of example 1, 2, or 3 wherein selecting the reference image is based on relevance of the reference image to the query.

Example 6. The method of example 1, 2, 3, 4, or 5 wherein selecting an image from the second cluster based on the similarity score selects the image from the second cluster from among images with a similarity score higher than a first threshold.

Example 7. The method of example 1, 2, 3, 4, or 5 wherein selecting an image from the second cluster based on the similarity score selects the image from the second cluster from among images with a similarity score lower than a second threshold.

Example 8. The method of example 1, 2, 3, 4, 5, 6, or 7 wherein calculating the similarity score is performed by a trained machine learning model.

Example 9. The method of example 1, 2, 3, 4, 5, 6, or 7 wherein calculating the similarity score for an image in the second cluster is performed by comparing attributes of the reference image to the image in the second cluster.

Example 10. The method of example 1, 2, 3, 4, 5, 6, 7, 8, or 9 wherein the selection metric is based on the similarity scores for images in the image row and wherein the selected display image row has a minimum or maximum selection metric compared to other image rows.

Example 11. The method of example 1, 2, 3, 4, 5, 6, 7, 8, 9, or 10 further comprising:
  selecting a set of representative images, each image in the set of representative images being representative of a corresponding image row;
  causing display of the set of representative images to the user in a user interface;
  receiving a selection of an image in the set of representative images; and
  responsive to the selection, causing display of the corresponding image row to the user in a user interface.

Example 12. The method of example 11 wherein the representative images are selected based on a centroid of the image row.

Example 13. The method of example 1, 2, 3, 4, 5, 6, 7, 8, 9, 10, 11, or 12 further comprising:
  creating a search cluster from a plurality of images in a user's search history, each image in the search cluster having the at least one image attribute in common;
  selecting a reference image from the search cluster;
  calculating a similarity score for each image in the first cluster; and
  selecting an image from the first cluster based on the similarity score.

Example 14. An apparatus comprising means to perform a method as in any preceding example.

Example 15. Machine-readable storage including machine-readable instructions, when executed, to implement a method or realize an apparatus as in any preceding example.

Example 16. A machine implemented method, comprising:
  receiving a plurality of images identified in response to a query submitted by a user;
  clustering the plurality of images into a plurality of clusters, images in each cluster having at least one image attribute in common;
  selecting a references image in a first cluster;
  calculating a similarity score for images in a second cluster;
  selecting an image from the second cluster based on the similarity score;
  creating an image row comprising the reference image and the selected image;
  repeating the selecting and calculating operations for a new reference image selected from the first cluster until a stopping criteria es met;
  selecting a display image row based on a selection metric calculated for each image row; and
  causing display of the display image row.

Example 17. The method of example 16 further comprising:
  setting the selected image as the reference image;
  calculating a similarity score for each image in a third cluster;
  selecting an image from the third cluster based on the similarity score.

Example 18. The method of example 16 further comprising:
  identifying at least one attribute for a subset of the images in the first cluster, a subset of images in the second cluster, or both, using a trained machine learning model.

Example 19. The method of example 16 wherein selecting the reference image is based on user search history.

Example 20. The method of example 16 wherein selecting the reference image is based on relevance of the reference image to the query.

Example 21. The method of example 16 wherein selecting an image from the second cluster based on the similarity score selects the image from the second cluster from among images with a similarity score higher than a first threshold.

Example 22. The method of example 16 further comprising:
  selecting a set of representative images, each image in the set of representative images being representative of a corresponding image row;
  causing display of the set of representative images to the user in a user interface;
  receiving a selection of an image in the set of representative images; and
  responsive to the selection, causing display of the corresponding image row to the user in a user interface.

Example 23. The method of example 16 wherein calculating the similarity score is performed by a trained machine learning model.

Example 24. The method of example 16 wherein calculating the similarity score for an image in the second cluster is performed by comparing attributes of the reference image to the image in the second cluster.

Example 25. The method of example 16 wherein the selection metric is based on the similarity scores for images in the image row and wherein the selected display image row has a minimum or maximum selection metric compared to other image rows.

Example 26. A system comprising a processor and computer executable instructions, that when executed by the processor, cause the system to perform operations comprising:
  receiving a plurality of images identified in response to a query submitted by a user;
  clustering the plurality of images into a plurality of clusters, images in each cluster having at least one image attribute in common;
  for each cluster in the plurality of clusters, perform the following operations:
  selecting a references image in a reference cluster;
  calculating a similarity score for each image in a second cluster;
  selecting an image from the second cluster based on the similarity score; and
  select a previously unselected cluster as the second cluster;

creating an image row comprising the reference image and all corresponding selected images for each of the selected reference images;

selecting a display image row based on a selection metric for each image row; and causing display of the display image row.

Example 27. The system of example 26 further comprising:

setting the selected image as the reference image;

calculating a similarity score for each image in a third cluster;

selecting an image from the third cluster based on the similarity score.

Example 28. The system of example 26 further comprising:

identifying at least one attribute for a subset of the images in the first cluster, a subset of images in the second cluster, or both, using a trained machine learning model.

Example 29. The system of example 26 wherein selecting the reference image is based on user search history.

Example 30. The system of example 26 further comprising:

creating a search cluster from a plurality of images in a user's search history, each image in the search cluster having the at least one image attribute in common;

selecting a reference image from the search cluster;

calculating a similarity score for each image in the first cluster; and selecting an image from the first cluster based on the similarity score.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computing system comprising:
a processor; and
memory storing instructions that, when executed by the processor, cause the processor to perform acts comprising:
identifying images based upon a received query;
clustering the images into clusters, wherein the clusters include a first cluster, a second cluster, and a third cluster;
selecting a first image, for display, from the first cluster;
calculating a first similarity score between the first image and a second image in a second cluster;
selecting the second image, for display, from the second cluster based upon the first similarity score;
calculating a second similarity score between the first image and a third image in the third cluster;
selecting the third image, for display, from the third cluster based upon the second similarity score; and
subsequent to selecting the first image from the first cluster, the second image from the second cluster, and the third image from the third cluster, causing the first image, the second image, and the third image to be displayed in an image row based upon the query.

2. The computing system of claim 1, wherein each image belonging to the first cluster has a first value for a first attribute, each image belonging to the second cluster has a second value for a second attribute, and each image belonging to the third cluster has a third value for a third attribute.

3. The computing system of claim 1, wherein each image belonging to the first cluster has a first value for an attribute, each image belonging to the second cluster has a second value for the attribute, and each image belonging to the third cluster has a third value for the attribute.

4. The computing system of claim 1, the acts further comprising:

prior to selecting the second image from the second cluster, computing a third similarity score between the first image and a fourth image in the second cluster, wherein the second image is selected from the second cluster based upon the first similarity score being greater than the third similarity score.

5. The computing system of claim 1, the acts further comprising:

prior to selecting the second image from the second cluster, computing a third similarity score between the first image and a fourth image in the second cluster, wherein the second image is selected from the second cluster based upon the first similarity score being lower than the third similarity score.

6. The computing system of claim 1, wherein the first image, the second image, and the third image are displayed in the image row on a search engine results page (SERP).

7. The computing system of claim 1, wherein the first image, the second image, and the third image are displayed in the image row of images, the acts further comprising:

selecting a fourth image from the first cluster; and causing the fourth image to be displayed in a second row of images that is separate from the image row of images.

8. The computing system of claim 7, the acts further comprising:

calculating a third similarity score between the fourth image and a fifth image in the second cluster; and selecting the fifth image from the second cluster based upon the third similarity score, wherein the fifth image is displayed in the second row of images with the fourth image.

9. The computing system of claim 1, wherein the images are clustered into the clusters based upon metadata assigned to the images, wherein the metadata identifies values of attributes of the image.

10. The computing system of claim 1, the acts further comprising:

assigning a first relevance score to the first image based upon the query;

assigning a second relevance score to the second image based upon the query;

assigning a third relevance score to the third image based upon the query, wherein the first image is selected as being representative of a group of images that includes the first image, the second image, and the third image, and further wherein the first image is selected as being representative of the group of images based upon the first relevance score being higher than both the second relevance score and the third relevance score.

11. The computing system of claim 10, wherein causing the first image, the second image, and the third image to be displayed based upon the query comprises:

causing the first image to be displayed due to the first image being selected as being representative of the group of images;

receiving a user selection of the first image; and causing the second image and the third image to be displayed together with the first image upon receiving the user selection of the first image.

12. A method for displaying images to a user of a search engine based upon a query, the method comprising:

receiving a query from a user of a computing device;

identifying images based upon the query;

clustering the images into clusters, where the clusters include a first cluster, a second cluster, and a third cluster;

selecting a first image, for display, from the first cluster;

computing a first similarity score between the first image and a second image in the second cluster;

selecting the second image, for display, from the second cluster based upon the first similarity score;

computing a second similarity score between the first image and a third image in the third cluster;

selecting the third image, for display, from the third cluster based upon the second similarity score; and based upon the first image, the second image, and the third image being selected, returning the first image, the second image, and the third image to the computing device to be displayed in an image row based upon the query.

13. The method of claim 12, wherein the first image, the second image, and the third image are included in the image row of images, and further wherein the image row of images is positioned on a search engine results page (SERP) relative to a second row of images based upon an aggregate of the first similarity score and the second similarity score.

14. The method of claim 12, wherein the first image is selected from the first cluster based upon a popularity score assigned to the first image.

15. The method of claim 12, wherein the first image is selected from the first cluster based upon the first image previously being viewed by the user.

16. The method of claim 12, wherein each image belonging to the first cluster has a first value for a first attribute, each image belonging to the second cluster has a second value for a second attribute, and each image belonging to the third cluster has a third value for a third attribute.

17. The method of claim 12, wherein each image belonging to the first cluster has a first value for an attribute, each image belonging to the second cluster has a second value for the attribute, and each image belonging to the third cluster has a third value for the attribute.

18. The method of claim 17, wherein the attribute is one of color, view orientation, background color, background type, or zoom level.

19. A computer storage medium comprising executable instructions that, when executed by a processor, cause the processor to perform operations comprising:

receiving a query from a computing device of a user;

selecting a set of images to return to the computing device of the user in response to receipt of the query; and upon selecting the set of images, returning the set of images to the computing device to be displayed in an image row based upon the query, wherein selecting the set of images to return to the computing device to be displayed comprises:

identifying images based upon the query, wherein the images are identified as being relevant to the query;

clustering the images into clusters, wherein the clusters include a first cluster, a second cluster, and a third cluster;

selecting a first image, for display, from the first cluster;

computing a first similarity score between the first image and a second image in the second cluster;

computing a second similarity score between the first image and a third image in the second cluster;

selecting the second image, for display, from the second cluster based upon the first similarity score;

selecting the third image, for display, from the third cluster based upon the second similarity score, wherein the first image, the second image, and the third image are included in the set due to the first image, the second image, and the third image being selected.

20. The computer storage medium of claim 19, wherein selecting the set of images to return to the computing device to be displayed further comprises:

computing a third similarity score between the first image and a fourth image in the second cluster; and comparing the first similarity score to the third similarity score, wherein the second image is selected from the second cluster based upon the comparing of the first similarity score to the third similarity score.

* * * * *